Oct. 24, 1967  J. F. NIEDZWIECKI  3,348,291
FLUID OPERATED STUD DRIVER TOOL
Filed July 26, 1965  4 Sheets-Sheet 1

INVENTOR

JOSEPH F. NIEDZWIECKI

INVENTOR
JOSEPH F. NIEDZWIECKI

Oct. 24, 1967    J. F. NIEDZWIECKI    3,348,291
FLUID OPERATED STUD DRIVER TOOL
Filed July 26, 1965    4 Sheets-Sheet 3

INVENTOR
JOSEPH F. NIEDZWIECKI

Oct. 24, 1967   J. F. NIEDZWIECKI   3,348,291
FLUID OPERATED STUD DRIVER TOOL
Filed July 26, 1965   4 Sheets-Sheet 4
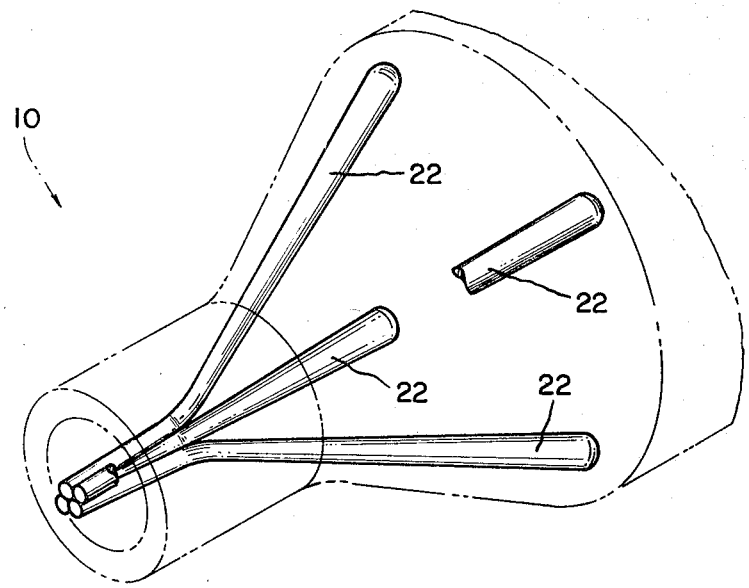
FIG. 6
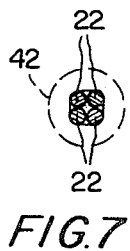 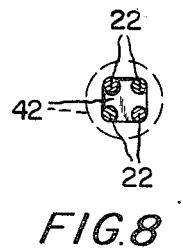 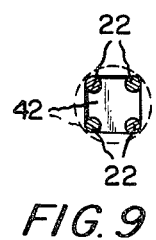 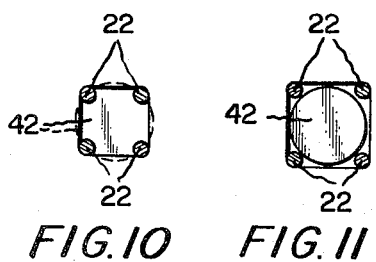
FIG.7   FIG.8   FIG.9   FIG.10   FIG.11
INVENTOR
JOSEPH F. NIEDZWIECKI United States Patent Office 3,348,291
Patented Oct. 24, 1967

3,348,291
FLUID OPERATED STUD DRIVER TOOL
Joseph F. Niedzwiecki, Athens, Pa., assignor to Ingersoll-Rand Company, New York, N.Y., a corporation of New Jersey
Filed July 26, 1965, Ser. No. 474,832
7 Claims. (Cl. 29—212)

ABSTRACT OF THE DISCLOSURE

A fluid operated stud driver tool wherein locking means, normally retaining a supply of studs in stored position, are cam unlocked by the piston means of the tool to cause studs to be individually supplied to the latter.

This invention relates to power operated tools and has particular reference to the provision of a new and improved fluid operated tool for inserting anti-skid devices such as studs into a rubber tire or the like.

Conventionally, a fluid operated stud driver tool of this type includes a plurality of fingers or jaws which are inserted into a preformed hole in the rubber tire or the like and opened to expand the hole. The stud to be inserted into the hole is directed into axial alignment with a fluid actuated piston which is longitudinally aligned with the hole and is urged thereby into the expanded hole in the rubber tire. The fingers of the tool are then closed and removed from the hole, whereupon the hole reverts to its preformed dimensions and snugly receives the stud to retain it in operative position in the rubber tire.

In the operation of conventional stud driver tools of this type, however, considerable difficulty has been encountered in supplying the studs individually to the tool piston and in inserting the studs, undamaged and unburred, at their proper depths in the holes in the rubber tire. Generally, these difficulties have arisen due to the failure of the tool fingers to sufficiently enlarge the holes to permit proper insertion of the studs and, also, to the employment of inherently weak structures to supply the studs to the piston and the frequent use of the studs, themselves, to cam open the fingers of the tool.

The principal object of the present invention is to provide a new and improved fluid operated stud driver tool wherein durable, positive acting means automatically align each of the studs individually with the piston means of the tool.

Other objects and advantages of the invention will be apparent from the following description taken in connection with the accompanying drawings. It will be understood that changes may be made in the details of construction and arrangement of parts shown and described as the preferred form of the invention has been given by way of illustration only.

Referring to the drawings:

FIG. 2 is a fragmentary, elevational sectional view of the stud driver tool illustrated in FIG. 1, showing the tool in the process of inserting a stud into a rubber tire or the like;

FIG. 6 is an enlarged view in perspective of the forward end of the stud driver tool showing the details of construction of the fingers of the tool; and FIGS. 7 through 11 are diagrammatic views illustrating the opening of the fingers relative to the head of a stud which is being inserted into the rubber tire or the like.

Figure 1:
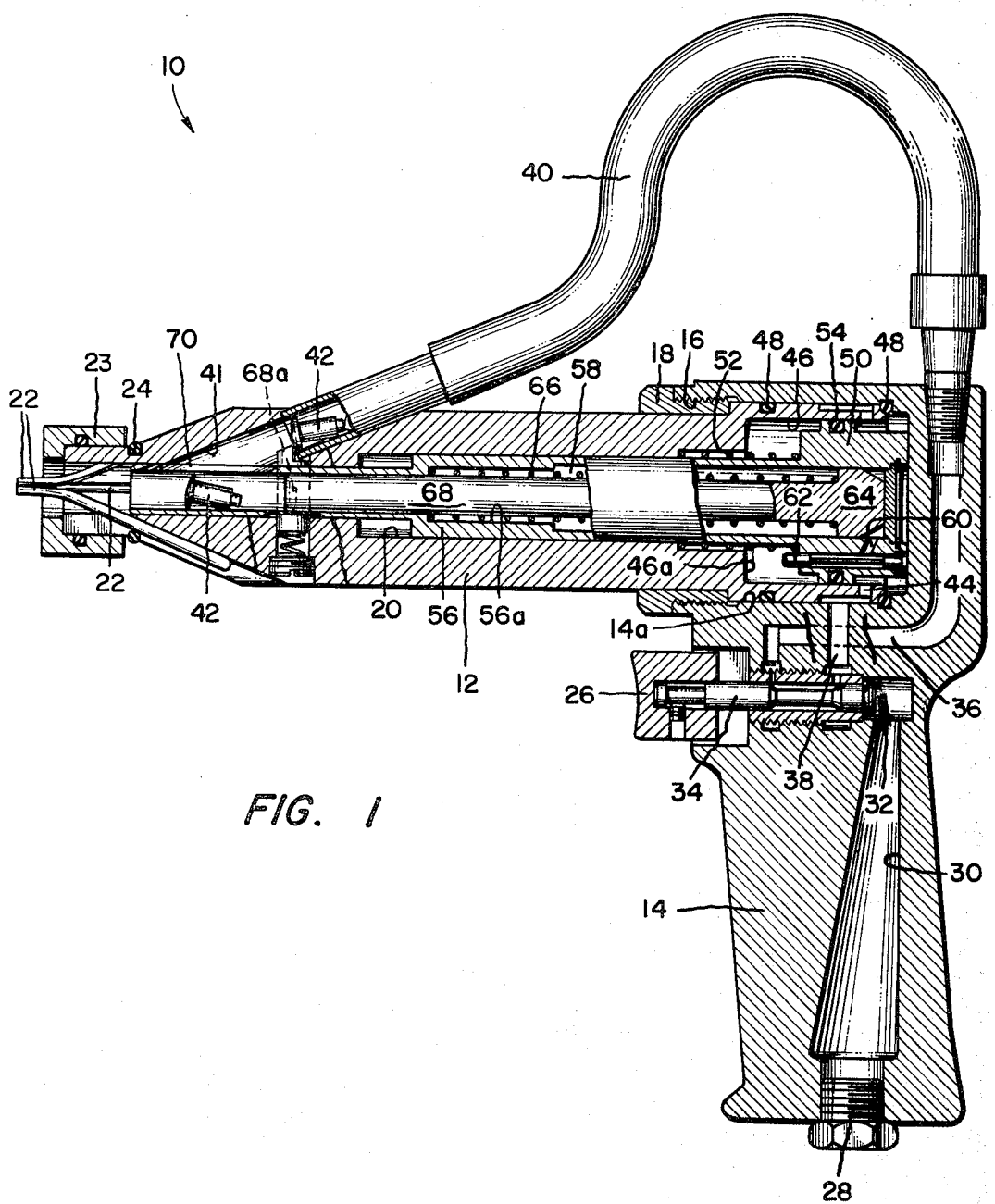
FIG. 1 is an elevational view, partially broken away and in section, of a stud driver tool constructed in accordance with the present invention.

Referring more particularly to the drawings wherein similar reference characters designate corresponding parts throughout the several views, FIG. 1 illustrates a stud driver tool designated generally as 10 which is constructed in accordance with the present invention. The stud driver tool 10 comprises a housing formed to include a handle 14 having a recess 14a and a barrel 12 extending into the recess 14a and secured therein by a threaded connection 16 between a retainer ring 18 carried by the barrel 12 and the handle 14. The barrel 12, as will be seen from FIG. 1, includes a bore 20 which extends longitudinally therethrough.

The barrel 12 pivotally carries a plurality of cooperating fingers or jaws 22 which extend into the bore 20 and project longitudinally forward thereof at the output end of the stud driver tool 10. The fingers 22 are retained in normally closed relationship by a retainer ring 24 which extends circumferentially around the finger 22 and the barrel 12 intermediate the opposing longitudinal ends of the fingers 22. In order to control the extent of the projection of the fingers 22 forwardly by the stud driver tool 10, a depth control means such as the cylindrical spacer 23 shown in FIG. 1 may be connected to the barrel 12 to operatively extend the output end of the stud driver tool 10. It will be seen that in this manner the depth to which the fingers 22 will extend into a hole in a rubber tire or the like may be adjusted as required for the length of the stud to be inserted by the stud driver tool 10.

The handle 14 carries the actuating means or trigger 26 of the stud driver tool 10 and includes a fluid inlet 28 which is adapted to be operatively connected to a source of compressed air or other suitable motive fluid (not shown). The fluid inlet 28 communicates through a fluid passage 30 with a valve chamber 32 which contains a throttle valve 34. The throttle valve 34 is connected to the trigger 26 for longitudinal movement within the valve chamber 32 and is adapted to permit flow of compressed air to the fluid passage 38, which communicates with the valve chamber 32, upon the depression of the trigger 26. A fluid passage 36 communicates through the valve chamber 32 with the fluid passage 38 upon the release of the trigger 26 and receives exhaust therefrom.

The fluid passage 36 is operatively connected to one end of a feed hose or conduit 40 which communicates at its opposing longitudinal end with a bore 41 connected to the bore 20 adjacent the output end of the stud driver tool 10. The feed hose 40 stores the studs 42 in longitudinal alignment and, in the illustrated embodiment of the invention, moves the studs 42 towards the bore 20 in response to the passage of compressed air through the fluid passage 36. Alternatively, however, the feed hose 40 could be constructed and arranged to gravity feed the studs 42 into the bore 20, whereupon the fluid passage 36 could be used to carry the exhaust from the stud driver tool 10. Further, alternatively, the feed hose 40 could be operatively connected to the outer piston chamber 46 of the stud driver tool 10 to receive live air therefrom, again permitting the use of the fluid passage 36 as an exhaust.

The fluid passage 38 communicates the valve chamber 34 with a fluid port 44 leading to the first or outer piston chamber 46 formed adjacent the extreme rearward limits of the bore 20. The fluid passage 38 supplies compressed air to the outer piston chamber 46 upon the depression of the trigger 26 and directs exhaust air from the outer piston chamber 46 through the valve chamber 32 to the fluid passage 36 during the exhausting of the outer piston chamber 46. A plurality of resilient sealing rings 48 are interposed intermediate the barrel 12 and the handle 14 adjacent the juncture thereof and prevent the escape of compressed air from the outer piston chamber 46 between the barrel 12 and the handle 14.

A first or outer piston 50 is operatively disposed within the outer piston chamber 46 for forward movement therein upon the passage of compressed air into the outer piston chamber 46 and is returned by a spring or similar resilient member 52. The outer piston 50 is provided with a circumferential ring seal 54 for preventing the leakage of compressed air from the outer piston chamber 46 and carries a hollow first or outer piston extension rod 56 which projects longitudinally through the bore 20 to the output end of the stud driver tool 10. The outer extension rod 56 is adapted for slidable movement within the bore 20 and is constructed of such length that it engages and opens the normally closed fingers 22 during the forward movement of the outer piston 50 within the outer piston chamber 46.

A second or inner piston chamber 58 is formed within the outer piston 50 and communicates through a fluid passage 60 in the outer piston 50 with the outer piston chamber 46. A control valve 62 is slidably disposed within the fluid passage 60 to prevent the passage of compressed air therethrough until the outer piston 50 has been moved to its extreme forward position and the forward face 46a of the outer piston chamber 46 opens the control valve 62. Thus, compressed air in the outer piston chamber 46 can pass to the inner piston chamber 58 only when the outer piston 50 is in its extreme forward position.

A second or inner piston 64 is operatively disposed within the inner piston chamber 58 for forward movement therein upon the passage of compressed air into the inner piston chamber 58 and is returned by a spring or similar resilient member 66. The inner piston 64 carries a second or inner piston extension rod 68 which projects longitudinally into the bore 56a in the hollow extension rod 56 and is slidable therein. The inner extension rod 68 includes a recess 68a in its forward end adapted to locate a stud 42 in proper driving position and is of such length that, with the inner piston 64 in its extreme rearward position as shown in FIG. 1, it terminates adjacent the communication of the feed hose 40 with the bore 20 in the barrel 12.

The outer extension rod 56 includes a peripheral opening 70 constructed and arranged to feed the studs 42 from the feed hose 40 into the bore 56a forward of the front end of the inner extension rod 68 when the outer piston 50, as shown in FIG. 1, is in its extreme rearward position. During the driving of a stud 42 thus supplied to the bore 56a, however, the forward movement of the outer extension rod 56 moves the opening 70 out of alignment with the feed hose 40 to prevent the passage of further studs 42 into the bore 56a.

Figure 4:
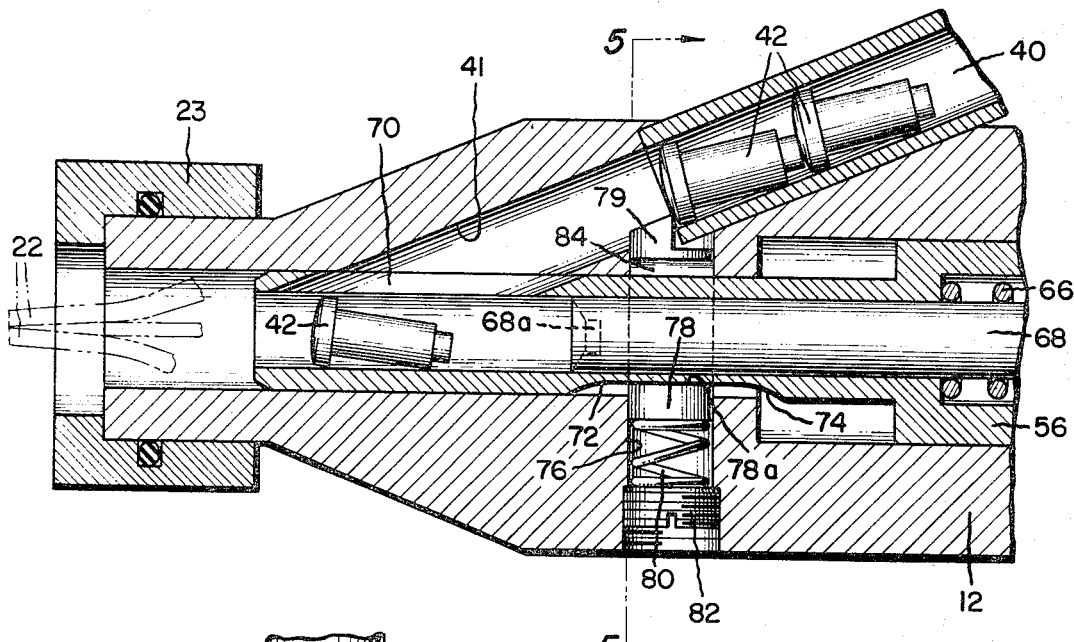
FIG. 4 is an enlarged, fragmentary sectional view showing the means for aligning the studs individually with the piston means of the stud driver tool.
Figure 5:
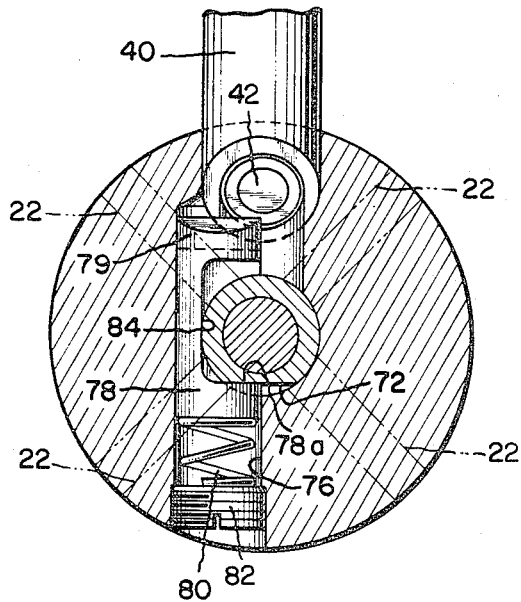
FIG. 5 is a sectional view of the aligning means taken on line 5–5 of FIG. 4, looking in the direction of the arrows.

In order to insure that only a single stud 42 is supplied to the inner extension rod 68 during each cycle of the operation of the stud driver tool 10, durable, positive acting means are provided within the stud driver tool 10 for permitting only a single stud 42 to be supplied to the bore 56a upon each alignment of the opening 70 with the feed hose 40. More specifically, as will be seen from FIGS. 4 and 5, a portion 72 of the outer extension rod 56 is reduced in cross section and a ramp or inclined surface 74 is formed at the juncture of the rear end of the portion 72 and the remainder of the outer extension rod 56.

A substantially transverse bore 76 is formed within the barrel 12 such as to be normally in alignment with the portion 72 of the outer extension rod 56 when the outer piston 50 is in its extreme rearward position. A lug 78 is located within the bore 76 and is biased towards the outer extension rod 56 by a spring or similar resilient member 80 which is retained in operative position within the bore 76 by a threaded cap or closure member 82. The lug 78 is provided with a notch 84 adapted to receive the outer extension rod 56 to permit independent longitudinal movement thereof and has a cam surface 78a in engagement with the outer extension rod 56. A portion 79 of the lug 78 extends around the outer extension rod 56 into the feed hose 40 to engage the longitudinally forward stud 42 therein and restrain such from movement towards the opening 70.

The portion 72 of the outer extension rod 56 is longitudinally dimensioned such that, as the outer extension rod 56 is urged forwardly towards the cooperating ends of the fingers 22 by the action of compressed air in the outer piston chamber 46 upon the outer piston 50, the lug 78 is engaged by the ramp 74 and forced thereby against the spring 80. The portion 79 of the lug 78 extending into the feed hose 40 is thus urged inwardly towards the outer extension rod 56, thereby unblocking the feed hose 40 to permit the studs 42 to advance such that the leading stud 42 passes onto the outer extension rod 56. Upon the return stroke of the outer extension rod 56, the lug 78 rides upon the ramp 74 until it engages the portion 72 of the outer extension rod 56 whereupon the spring 80 reurges the portion 79 of the lug 78 into the feed hose 40. Thus, all but the leading stud 42 are relocked in longitudinal alignment within the feed hose 40. The stud 42 which has been supplied to the outer extension rod 56 remains thereon until the outer extension rod 56 has completed its return stroke and the outer piston 50 is in its most rearward position such that the opening 70 is aligned with the feed hose 40. Then the supplied stud 42 passes through the opening 70 into the bore 56a forwardly of the inner extension rod 68 for insertion into a rubber tire or the like (not shown) during the succeeding cycle of the operation of the stud driver tool 10.

Thus, it will be seen that the outer extension rod 56 both opens the fingers 22 and locates a single stud 42 in operative relation to the inner extension rod 68 during each cycle of the operation of the stud driver tool 10. In this manner, the studs 42 are automatically and individually supplied to the inner extension rod 68 and driven thereby from the stud driver tool 10 without contact with the fingers 22 or any other portion of the stud driver tool 10 that might damage or otherwise injure the studs 42.

The fingers 22 of the stud driver tool 10 are particularly constructed and arranged to avoid damage to the studs 42 during their insertion into the holes in the rubber tire or the like (not shown). More specifically, as is shown in FIGS. 6 and 7, the fingers 22 are preferably four in number and are concentrically arranged such that their cooperating ends extend forwardly of the barrel 12 at the output end of the stud driver tool 10. Each of the fingers 22 is formed with a circular cross section to present only a minimal interference to the studs 42 during their insertion into the holes in the rubber tire or the like while, due to the relative arrangement and number of the fingers 22, cooperating with the others thereof to expand the hole in the rubber tire or the like sufficiently to prevent interference between the studs 42 and the tire or the like.

Thus, as will be seen from FIGS. 7 through 11 wherein the four fingers 22 are shown opening relative to the head of a stud 42, the fingers 22 as herein provided expand the holes in the rubber tire or the like sufficiently to eliminate any possibility that the tire or the like will contact the studs 42 to provide resistance to the insertion thereof. In this manner, the variable resistance or variable push-back force commonly encountered in the operation of conventional stud driver tools is avoided, and the depth of insertion of the studs 42 by the stud driver tool 10 of the present invention may be maintained at a controlled, uniform level.

Also, as the fingers 22 are each formed of circular cross section, there is no necessity that they be hand radiused or machined during their manufacture to eliminate sharp corners that might otherwise cut or damage the tire or the like. Thus, the fingers 22 are more economical in construction as well as more efficient in operation than those of most stud drivers of this type.

The operation of the stud driver tool 10 is believed to be apparent from the foregoing description. However, for the purposes of clarity of description, a brief summary of the operation of the stud driver tool 10 follows.

With the stud driver tool 10 as shown in FIG. 1, upon the depression of the trigger 26, compressed air from a source thereof (not shown) flows through the fluid inlet 28 and the fluid passage 30 in the handle 14 and enters the valve chamber 32 therein. This compressed air then flows through the fluid passage 38 to the outer piston chamber 46 wherein it urges the outer piston 50 forwardly towards the output end of the stud driver tool 10.

Figure 2:
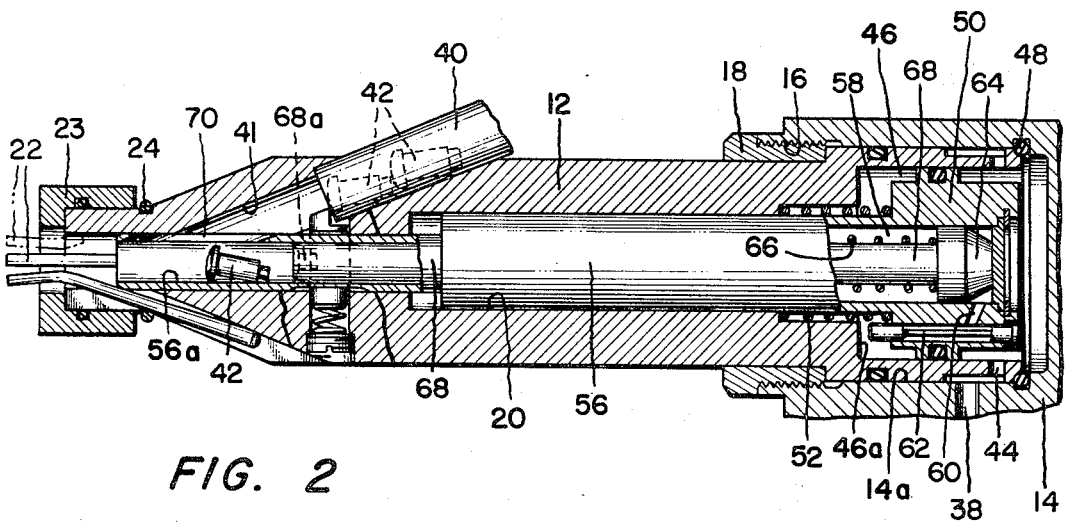

As the outer piston 50 moves forwardly within the outer piston chamber 46, the outer extension rod 56 which is carried thereby simultaneously moves forwardly within the bore 20 in the barrel 12. This forward movement of the outer extension rod 56, as shown in FIG. 2, causes such to engage and open the fingers 22 to enlarge the opening in the rubber tire or the like (not shown) such that a stud 42 may be driven therein without interference with either the fingers 22 or the sides of the hole. This forward movement of the outer extension rod 56, also, causes the lug 78 to ride on the ramp 74 whereupon the lug 78 is urged against the spring 80 and the portion 79 thereof in the feed hose 40 is pulled therefrom. Thus, the studs 42 within the feed hose 40 are allowed to move forwardly therein such that the leading stud 42 is deposited upon the outside of the outer extension rod 56.

Figure 3:
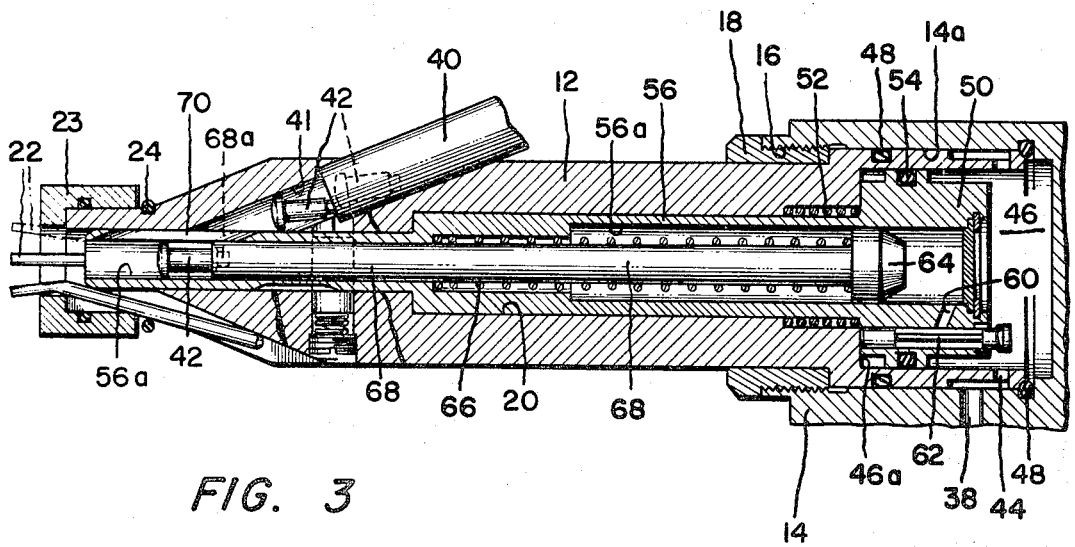
FIG. 3 is another fragmentary, elevational sectional view generally similar to FIG. 2, but showing a succeeding step in the operation of the stud driver tool.

When the outer piston 50 has moved to its extreme forward position, the control valve 62 in the fluid passage 60 leading to the inner piston chamber 58 is opened by the forward face 46a of the outer piston chamber 46 to permit passage of compressed air to the inner piston chamber 58. The compressed air thus entering the inner piston chamber 58 urges the inner piston 64 and its carried inner extension rod 68 longitudinally forwardly towards the output end of the stud driver tool 10, as shown in FIG. 3. As the inner extension rod 68 moves longitudinally forward within the bore 56a, it picks up the stud 42 which is in the bore 56a and drives it through the open fingers 22 into the expanded hole in the rubber tire or the like.

When the trigger 26 is released, the outer piston chamber 46 exhausts through the fluid passage 38 and the valve chamber 32 to the fluid passage 36, thereby longitudinally advancing the studs 42 remaining therein. However, as the inner piston chamber 58 is simultaneously exhausting into the outer piston chamber 46, no rearward movement of the outer piston 50 occurs until the inner piston chamber 58 has been substantially exhausted and the inner piston 64 returned by the spring 66. Upon the return of the inner piston 64, the passage of exhaust air from the inner piston chamber 58 to the outer piston chamber 46 is terminated and the outer piston chamber 46, thus, completely exhausts as the outer piston 50 is returned by the spring 52. This return of the outer piston 50, as will be seen, closes the fingers 22 and forces the portion 79 of the lug 78 into the feed hose 40 to block all but the leading stud 42 from the outer extension rod 56.

When the outer piston 50 is returned to its extreme rearward position, the opening 70 in the outer extension rod 56 is correspondingly realigned with the feed hose 40. Thus, the single stud 42 which has previouly been deposited upon the outside of the outer extension rod 56 passes into the bore 56a for insertion during the succeeding cycle of operation of the stud driver tool 10. The stud driver tool 10 is then ready for the beginning of its next cycle of operation.

From the foregoing it will be seen that I have provided new and improved means for accomplishing all of the objects and advantages of my invention.

Having thus described my invention, I claim:

1. A fluid operated tool for inserting studs into an opening in a rubber tire or the like, comprising:
   housing means including a piston chamber spaced from one end thereof and having a bore extending longitudinally from said piston chamber to said one end of said housing means;
   fluid actuated piston means disposed within said piston chamber for reciprocatory movement therein;
   means for reciprocating said piston means within said piston chamber;
   rod means carried by said piston means for reciprocatory movement therewith and extending into said bore in said housing means towards said one end thereof;
   means communicating with said bore in said housing means for supplying studs individually thereto adjacent said one end of said housing means; and
   a plurality of fingers projecting from said one end of said housing means normally cooperating to close said bore in said housing means and movable to expand said opening in said rubber tire;
   said means for supplying studs comprising passage means communicating with said bore in said housing means for conveying studs thereto;
   locking means extending through said bore in said housing means and projecting into said passage means to prevent passage of studs to said bore; and
   actuating means carried by said rod means for moving said locking means from said passage means sufficiently to permit passage of studs therethrough.

2. A fluid operated tool for inserting studs into an opening in a rubber tire or the like, comprising:
   housing means including a piston chamber spaced from one end thereof and having a bore extending longitudinally from said piston chamber to said one end of said housing means;
   fluid actuated piston means disposed within said piston chamber for reciprocatory movement therein;
   means for reciprocating said piston means within said piston chamber;
   rod means carried by said piston means for reciprocatory movement therewith and extending into said bore in said housing means towards said one end thereof;
   means communicating with said bore in said housing means for supplying studs individually thereto adjacent said one end of said housing means; and
   a plurality of fingers projecting from said one end of said housing means normally cooperating to close said bore in said housing means and movable to expand said opening in said rubber tire;

said means for supplying studs comprising passage means communicating with said bore in said housing means for conveying studs thereto;

locking means within said bore in said housing means arcuately around said rod means and projecting into said passage means to retain said studs therein; and actuating means carried by said rod means engaging said locking means during the reciprocation of said piston means for drawing such from said passage means to permit passage of studs therethrough.

3. A fluid operated tool according to claim 2 wherein resilient means bias said locking means towards said rod means and said actuating means comprises an inclined surface formed on said rod means.

4. A fluid operated tool according to claim 2 wherein resilient means bias said locking means towards said rod means and said passage means, said actuating means comprises a ramp formed on the circumference of said rod means, and said locking means comprises lug means interposed within said passage means substantially the length of a single stud from the communication of said passage means and said bore in said housing means.

5. A fluid operated tool for inserting studs into an opening in a rubber tire or the like, comprising:

housing means including a first piston chamber spaced from one end thereof and having a bore extending longitudinally from said first piston chamber to said one end of said housing means;

a first fluid actuated piston disposed within said first piston chamber for reciprocatory movement therein and containing a second piston chamber in communication with said first piston chamber;

a first piston rod carried by said first piston for reciprocatory movement therewith extending into said bore in said housing means towards said one end of said housing means and including a longitudinal bore therethrough;

a second fluid actuated piston disposed within said second piston chamber for reciprocatory movement therein;

a second piston rod carried by said second piston for reciprocatory movement therewith extending into said bore in said first piston rod towards said one end of said housing means;

means for supplying studs individually to said bore in said first piston rod intermediate said second piston rod and said one end of said housing means; and a plurality of fingers projecting from said one end of said housing means normally cooperating to close said bore in said housing means and movable to open said bore and expand said opening in said rubber tire;

said first piston rod extending adjacent said fingers for opening said fingers during the movement of said first piston towards said one end of said housing means;

said means for supplying studs individually to said bore in said second piston rod comprising passage means communicating with said bore in said second piston rod throughout a portion of the reciprocatory movement of said first piston for supplying studs to said bore in said first piston rod;

a locking member extending through said bore in said housing member and projecting into said passage means to prevent passage of studs therethrough; and means carried by said first piston rod engaging said locking member during the reciprocatory movement of said passage means to permit a single stud to pass therethrough.

6. A fluid operated tool according to claim 5 wherein resilient means bias said locking member towards said passage means, and said engaging means carried by said first piston rod for moving said locking member from said passage means comprises an inclined surface upon said first piston rod.

7. A fluid operated tool according to claim 6 wherein said fingers comprise four fingers of circular cross section carried by said housing means circumferentially of said bore therein extending through said bore in said housing means into engaging relationship over the open end thereof.

References Cited
UNITED STATES PATENTS

| | | | |
|---|---|---|---|
| 1,720,318 | 7/1929 | Chisolm | 29—278 |
| 2,911,645 | 11/1959 | Crossen | 227—149 |
| 3,012,312 | 12/1961 | Brudney | 29—209 |
| 3,075,283 | 1/1963 | Jansch | 29—206 |
| 3,199,182 | 8/1965 | Harris et al. | 29—211 X |
| 3,222,766 | 12/1965 | Camargo | 29—203 |
| 3,258,835 | 7/1966 | Boggild et al. | 29—212 |

FOREIGN PATENTS 40-23401  12/1962  Japan.

THOMAS H. EAGER, *Primary Examiner.*